United States Patent [19]
VanDervort

[11] Patent Number: 5,764,626
[45] Date of Patent: Jun. 9, 1998

[54] RATE-MATCHED CELL IDENTIFICATION AND MODIFICATION, REPLACEMENT, OR INSERTION FOR TEST AND MEASUREMENT OF ATM NETWORK VIRTUAL CONNECTIONS

[75] Inventor: Cole S. VanDervort, Frederick, Md.

[73] Assignee: Telecommunications Techniques Corporation, Germantown, Md.

[21] Appl. No.: 560,117

[22] Filed: Nov. 17, 1995

[51] Int. Cl.$^6$ .................... H04J 3/14; H04L 12/56
[52] U.S. Cl. .............. 370/232; 370/236; 370/250; 370/253; 370/397; 370/401
[58] Field of Search ...................... 370/231, 232, 370/235, 236, 238, 250, 252, 253, 392, 395, 396, 397, 400, 401, 409, 410

[56] References Cited

U.S. PATENT DOCUMENTS

| | | | |
|---|---|---|---|
| 5,179,549 | 1/1993 | Joos et al. | 370/232 |
| 5,216,669 | 6/1993 | Hofstetter et al. | 370/396 |
| 5,257,311 | 10/1993 | Naito et al. | 370/399 |
| 5,271,000 | 12/1993 | Engbersen et al. | 370/244 |
| 5,280,469 | 1/1994 | Taniguchi et al. | 370/250 |
| 5,311,513 | 5/1994 | Ahmadi et al. | 370/230 |
| 5,313,453 | 5/1994 | Uchida et al. | 370/250 |
| 5,313,455 | 5/1994 | van der Wal et al. | 370/232 |
| 5,339,332 | 8/1994 | Kammerl | 370/253 |
| 5,343,463 | 8/1994 | van Tetering et al. | 370/253 |
| 5,357,510 | 10/1994 | Norizuki et al. | 370/395 |
| 5,390,174 | 2/1995 | Jugel | 370/392 |
| 5,402,416 | 3/1995 | Foglar et al. | 370/232 |
| 5,414,701 | 5/1995 | Shtayer et al. | 370/395 |
| 5,422,838 | 6/1995 | Lin | 365/49 |
| 5,450,394 | 9/1995 | Gruber et al. | 370/253 |
| 5,457,700 | 10/1995 | Merchant | 370/253 |
| 5,570,361 | 10/1996 | Norizuki et al. | 370/395 |

FOREIGN PATENT DOCUMENTS 0231967  8/1987  European Pat. Off. .

OTHER PUBLICATIONS

Tekelec Corporation, "ATM Pocket Guide", Publication No. 908–0119–01, Revision B, Jul. 1994.

*Primary Examiner*—Alpus H. Hsu
*Attorney, Agent, or Firm*—Michael de Angeli; Philip Florenzo

[57] ABSTRACT

A test instrument for monitoring operation of ATM communication networks is capable of identifying individual cells passing through a node to which the instrument is connected as belonging to a particular virtual connection, and transmitting test cells replacing the identified cells, transmitting modified identified cells, or augmenting cells transmitted over the identified virtual connection with operations, administration, and maintenance cells. Specific test cells can be detected by a second test instrument connected to a node elsewhere in the network for accurately monitoring specific network operating characteristics. Cell delay, cell delay variation, cell error rates, and the like may all be monitored by the test instrument according to the invention.

49 Claims, 4 Drawing Sheets

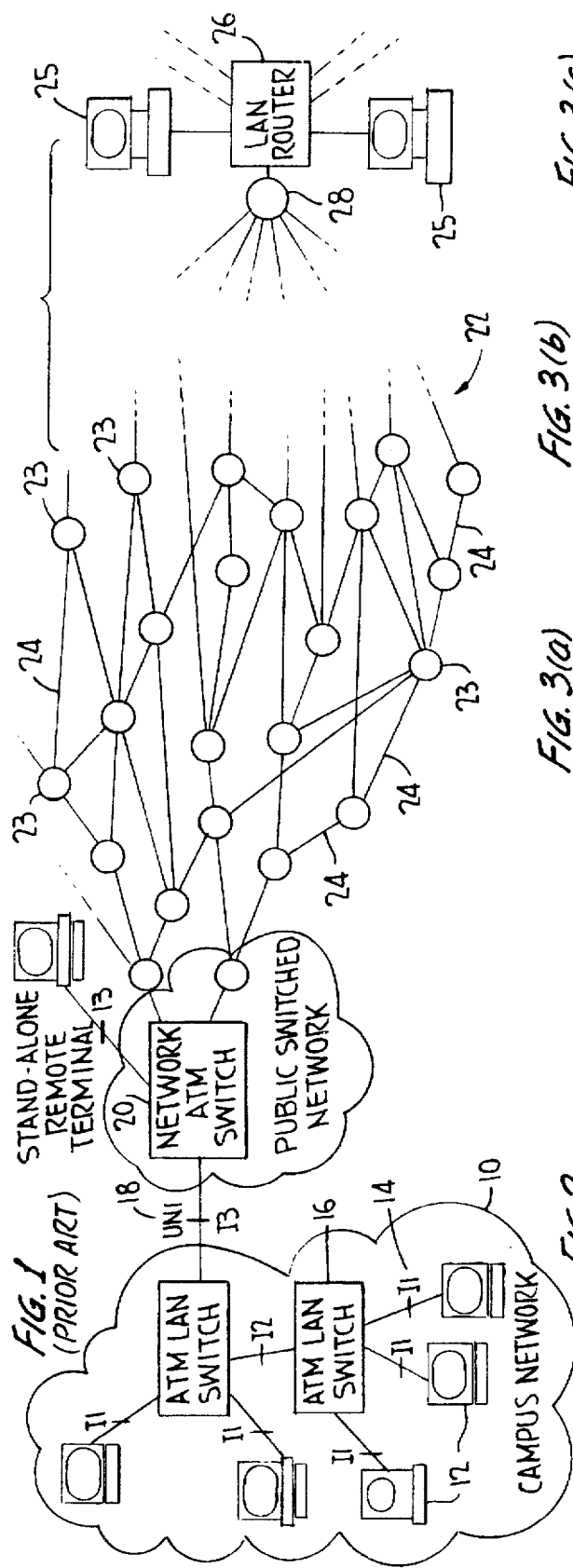
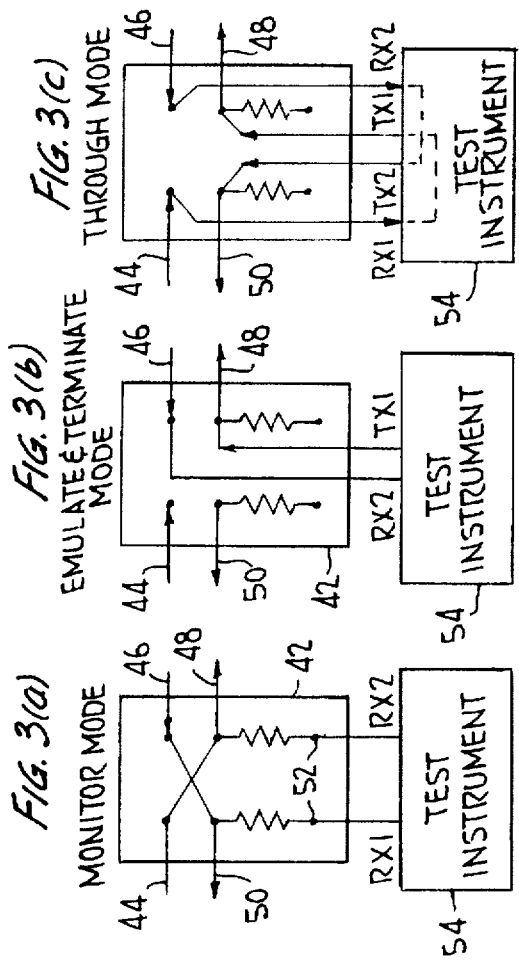
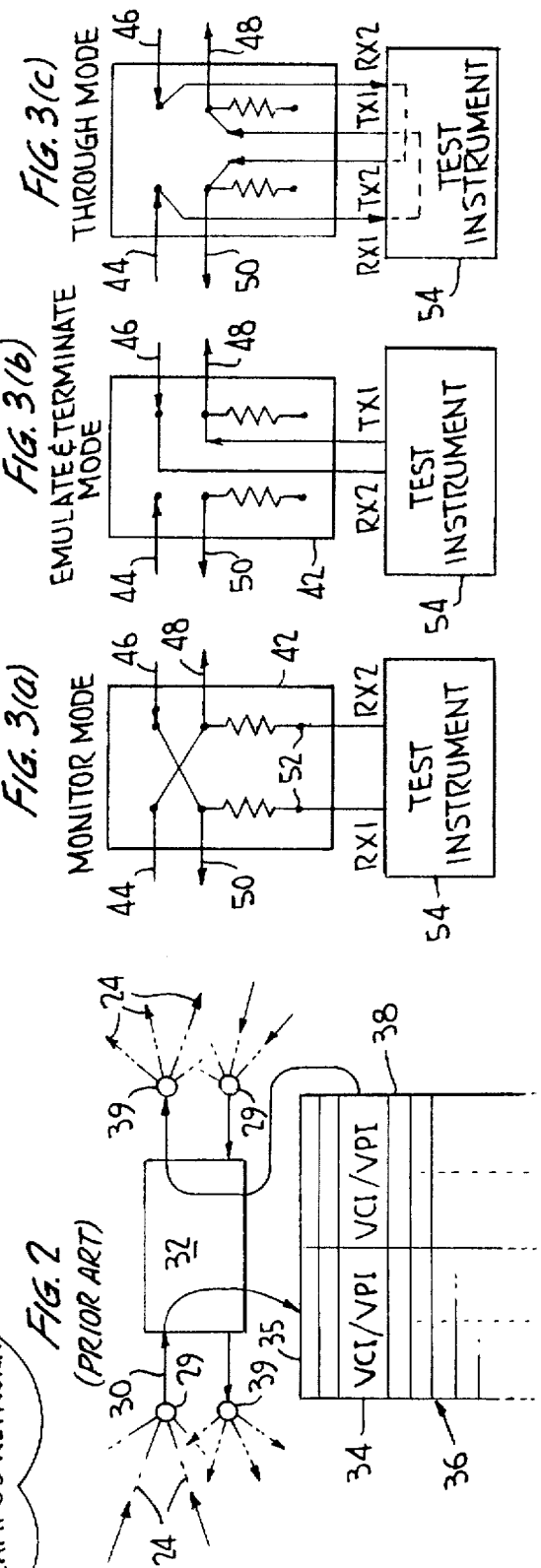

LEGEND:
GFC = GENERIC FLOW CONTROL    PTI = PAYLOAD TYPE IDENTIFIER
VPI = VIRTUAL PATH IDENTIFIER   CLP = CELL LOSS PRIORITY
VCI = VIRTUAL CHANNEL IDENTIFIER  HEC = HEADER ERROR CONTROL

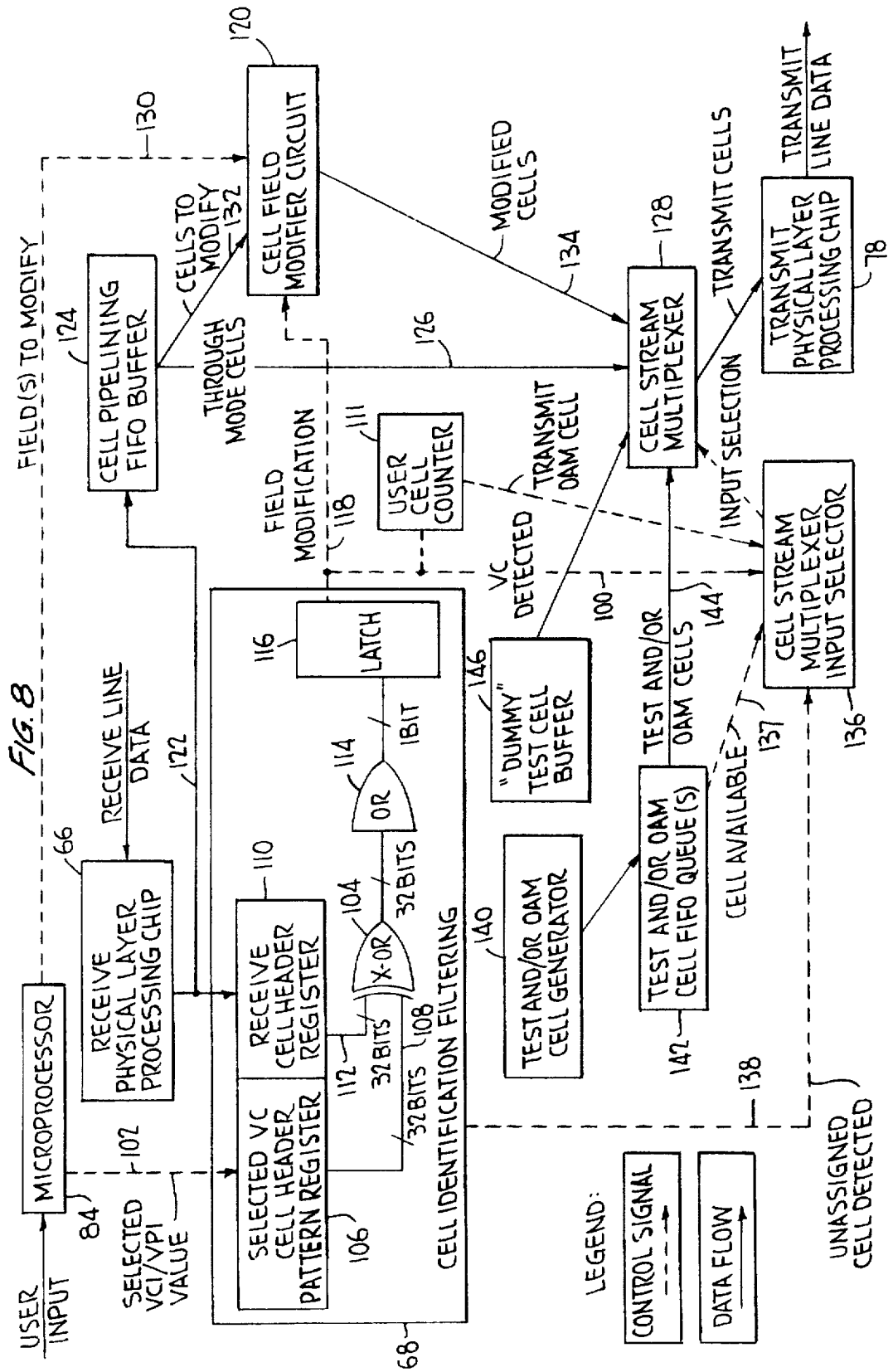

RATE-MATCHED CELL IDENTIFICATION AND MODIFICATION, REPLACEMENT, OR INSERTION FOR TEST AND MEASUREMENT OF ATM NETWORK VIRTUAL CONNECTIONS

CROSS REFERENCE TO RELATED APPLICATIONS

This application is one of four co-pending applications having generally related subject matter, that is, test instruments and methods for performing testing and measurement functions in ATM networks. The four applications are as follows:

Ser. No. 08/560,117, filed Nov. 17, 1995, for "Rate-Matched Cell Identification and Modification, Replacement, or Insertion for Test and Measurement of ATM Network Virtual Connections"; Ser. No. 08/560,285 filed Nov. 17, 1985, for "Measuring Round Trip Time in ATM Network Virtual Connections"; Ser. No. 08/563,552, filed Nov. 28, 1995, for "Statistics Collection for ATM Networks"; and Ser. No. 081560,286, filed Nov. 17, 1995, for "Measuring Burst Rate and Burst Size in ATM Network Virtual Connections". The disclosures of the other three applications are incorporated herein by reference.

FIELD OF THE INVENTION

This invention relates to a test instrument and methods of use for testing the operation of asynchronous transfer mode (ATM) telecommunication networks. More particularly, the invention relates to test instruments for testing transmission of cells belonging to individual virtual connections through the network.

BACKGROUND OF THE INVENTION

With the increase in use of computing facilities throughout modern society, and in particular with increased communication over optical fiber-linked networks having far higher transmission speeds than previous conductive wire connections, there is substantial interest in new methods of communication. More particularly, previous communication tended to be segregated between voice and data communication, with different networks being provided for each. Typically voice communication took place over the telephone system, while high speed data communication took place over dedicated lines; data communication is also possible in the telephone system, but only at substantially slower rates than provided by dedicated lines. More recently, digital video and image communications have become of increased interest, particularly for so-called multimedia applications.

The result is that substantial improvements in flexibility of communication techniques are needed, in particular, to permit convenient future upgrading of communication facilities over time as additional data sources become available. Still more specifically, it is imperative that standards be developed and implemented allowing voice, video, images, and data to be transmitted more or less interchangeably over varying transmission media, such that equipment installed at a particular time will not soon be obsolete, but can continue to be used for communication as overall communication speeds are increased in the future.

These needs are largely expected to be met through broad implementation of so-called asynchronous transfer mode (ATM) communication networks. As distinguished from synchronous transfer mode (STM) communications, ATM allows the traffic rate from a particular source to be increased or decreased upon demand when communication is desirable. By comparison, in STM, a particular user is assigned particular synchronous time slots on a particular communications medium, limiting the flexibility of the system. The significance of this distinction between asynchronous and synchronous transmission to the invention is discussed further below.

ATM networks are in the process of being installed in conformity with internationally-agreed upon standards for transmission of "cells" of data, including in "data" as used herein digitized voice communication, digitized images, and digitized video, as well as data per se. In ATM, all types of messages to be transmitted are divided into fixed length "cells", each cell including a header including cell payload type and routing information, and a fixed length "payload". The payload of each cell typically contains a relatively small portion of an overall message to be transmitted from a source to a destination. The ATM cells are transmitted by way of a source node into a network comprising a large number of switching nodes connected by communication links. Accordingly, an overall message to be transmitted from an originating source to an ultimate destination is divided into a number of cells, transmitted in sequence over a "virtual connection" established when the communication is established. Each cell transmitted as part of an ATM message transits the same virtual connection, that is, is routed through the same sequence of switching nodes and connecting links.

It is important in effective implementation of ATM networks that the specific type of communication links included in each virtual connection not be a constraint on the format of the ATM cell. That is, the cells of a particular ATM message may be transmitted by wire, by fiber optic cable, by satellite, or by combinations of these. The cell format itself remains unchanged. In this way, flexibility of the network configuration and implementation of future faster communications media can be provided without, for example, rendering obsolete the equipment used to generate cells from messages to be transmitted.

By comparison, according to another modern day communication technology, data is commonly transmitted in the so-called "frame relay" mode, wherein each "packet" transmitted includes the entire message. Hence each packet is of different length. In frame relay transmissions, the packet of data corresponding to the message is preceded by a single header, such that the entire message is transmitted in one long burst over a predetermined route through a series of nodes from a source node to a destination node. This system remains workable, but is relatively inflexible as traffic needs change from time to time. Further, frame relay transmission is best suited for communication of data per se, which tends to be "bursty". Voice and video communication have different intrinsic requirements.

More specifically, communication of data per se is typically time-insensitive, in that some time delay, and considerable variation in the time delay experienced by successive messages or segments of messages, between the time of transmission and the time of reception does not interfere with utility of communication. Voice and video transmissions are by comparison very sensitive to transmission time, in that all portions of the message must be received at a rate closely proportional to the rate at which they are transmitted, if important information is not to be lost. Variation in the delay between segments of a voice or video transmission is particularly disturbing to the receiving party.

In ATM, as noted, messages are divided into relatively small cells which are individually transmitted. For example, a voice communication may be transmitted in cells each effectively encoding single words, or even single syllables. The ATM format allows the individual cells of the message to be transmitted relatively instantaneously, such that they can be reassembled and delivered to a listener or viewer at the destination without perceptible delay. More specifically, because each message is transmitted over its own virtual connection, set up only after determination that the nodes involved have sufficient bandwidth to accommodate the anticipated cell rate, overloads can be avoided and the cell delay minimized.

It therefore will be appreciated that, in essence, an ATM communication involves setting up a virtual connection identifying a sequence of nodes extending between a source and a destination, and dividing the message into cells of equal length. The cells of the message are subsequently transmitted over the virtual connection, which may include each or all of wire conductors, optical links, or satellite relay links. At the ultimate destination, the headers of the cells are removed, the payloads are reassembled, returned to analog format when appropriate (e.g., in voice communication), and delivered to the user.

The basic format of the fixed-length ATM cell (a "cell" corresponding generally to a "packet", as that term is usually used), includes a header consisting of five eight-bit bytes (or "octets"), these including cell payload type and routing information, followed by 48 bytes of payload. Various standards organizations have agreed on the format of the header and the overall cell structure. See, for example, "ATM Pocket Guide", a publication of Tekelec of Calabasas, California. As shown therein, and as reproduced by FIG. 4 hereof, the ATM header of each cell includes at least 24 total bits of routing information, comprising 8 bits of "virtual path identifier" (VPI) information and 16 bits of "virtual channel identifier" (VCI) information.

In transmission of ATM cells, the VPI and VCI routing information in each cell header is updated at each node, responsive to predetermined information stored by each node at call origination. The VPI and VCI information stored in each cell at any given time is used by each node to route the cell to the next node in the series of nodes making up the virtual connection, as established at call origination.

More specifically, unlike a frame relay transmission, wherein the header information is unchanged as the packet transits the entire route from its originating source to its ultimate destination, in ATM, the VPI and VCI routing information in the header of each cell is updated as each intermediate node is transited.

As noted, each cell of any given ATM message transits the same virtual connection, that is, the same sequence of nodes. As part of the call origination process, information is stored at each node in the virtual connection, providing VPI and VCI information used to identify each incoming cell and update its VPI and VCI, so that the cell is properly switched to its next destination node in the virtual connection. Thus, as each cell is received at a node, its individual VPI and VCI information is examined by the node, and stored VPI and VCI information needed to convey that cell to the next node is used to update the header accordingly. It will therefore be appreciated that each node in an ATM network includes means for examining the header of each cell received and updating the VPI and VCI information accordingly.

The call origination process in ATM is well defined and need not be detailed here except to mention that when a call is originated, a series of "signaling" messages are passed back and forth between the originating source node, the intermediate nodes, and the ultimate destination node. The call origination process involves the sending of a message of predetermined format, indicating the relevant cell parameters, e.g., the total number of cells to be transmitted, and their anticipated rate of supply. Each node which receives this call set-up message considers the requirements of the call, e.g., the anticipated cell density, and the like, to determine whether it has bandwidth—that is, communications capability—sufficient to handle the anticipated number of cells. During this process each of the intermediate nodes ultimately forming part of the virtual connection to be thus established must in effect agree to the traffic requirements anticipated, and must store sufficient information to allow updating of the VPI and VCI as the cells of that message transit that particular node.

Quality of Service Parameters

ATM users typically will agree with a service provider to provide a certain quality of service, involving, for example, pre-agreed limitations on the cell error ratio, that is, the number of cells including errors that can be tolerated for a given number of cells transmitted, the cell loss ratio, that is, the number of cells that the network may fail to transmit for a given number of cells transmitted, as may occur due to oversubscription, and other parameters of operation. These parameters are agreed upon depending on the anticipated traffic. For example, voice and video communications typically can be effectuated allowing rather higher bit error rates than data communications; voice and video, however, are more sensitive to variation in cell delay than are data communications. Accordingly, these and other parameters must be measured in use, with respect to specific virtual connections, in order to ensure that the service contracted for is met by both user and service provider.

U.S. Pat. No. 5,343,463 to van Tetering et al discusses methods for measuring the performance characteristics of a path of an ATM telecommunications switching network by generically transmitting test packets (cells) while other live traffic is operating. U.S. Pat. No. 5,271,000 to Engbersen et al discloses a method and apparatus for testing and evaluating distributed networks by transmitting generic test packets through the network to a test packet analyzer where the transmitters are located at geographically distributed locations with respect to the analyzer. U.S. Pat. No. 5,457,700 to Merchant et al shows a test cell generator for inserting test cells in place of idle cells in an ATM network. As idle cells do not include VPI and VCI information assigning them to a virtual connection, Merchant, as in the cases of Van Tetering and Engbersen, is not capable of measurement of network performance with respect to a particular virtual connection. None of these references show systems capable of tracking transmission of a particular cell through the network.

OBJECTS OF THE INVENTION

It is therefore an object of the invention to provide an instrument and method for identifying the cells belonging to an individual virtual connection, for replacing these specific cells at a first test access point with predetermined test cells, and for detecting these test cells at a second test access point.

For example, in order to measure cell transfer delay, two-point cell delay variation, round trip travel time, the quality of service parameters enumerated above, and other relevant parameters of network operation with respect to one or more selected virtual connections, "live" cells identified in a cell sequence as belonging to a selected virtual connection may be replaced by predetermined test cells injected into the cell stream at a first access point by a first test instrument and detected by a second instrument at another access point to monitor their transmission. Due to the asynchronous nature of ATM communication, the rate of transmission of cells with respect to any virtual connection may change instantaneously, and may vary widely subject to the maximum rate possible on the specific transmission medium. It is accordingly an object of the invention to provide a first test instrument capable of inserting test cells in place of the identified cells of a selected virtual connection, in order to avoid disturbance of the cell transmission rate of the virtual connection. This process performed with respect to a particular virtual connection according to the invention is referred to as "rate-matched cell identification and replacement".

More specifically, normally continuous streams of cells are transmitted in both directions between pairs of nodes in the network. When there is no user traffic to be transmitted, "unassigned" or "idle" cells are transmitted. In order to avoid loss of user cells, and in order to avoid corrupting user data, it is often preferable to transmit test cells in the "cell slots" in which unassigned or idle cells would otherwise be transmitted. Therefore, it is also an object of the invention to provide an instrument and method for identifying "unassigned" or "idle" cells in addition to the cells belonging to an individual virtual connection. Preferably, the unassigned or idle cells are replaced with test cells configured as "operations, administration, and maintenance" (OAM) cells, which are treated differently by nodes in the network than ordinary "user" cells. The OAM-configured test cells perform functions associated with OAM cells, e.g., measuring the quality of service parameters associated with an in-service virtual connection. This process performed according to the invention is referred to as "rate-matched insertion" of test cells into a virtual connection.

According to a further object of the invention, one or more bits of a user cell may be modified, constituting that cell a test cell. For example, a bit of the header may be altered to test the header error correction circuitry provided at the individual nodes.

SUMMARY OF THE INVENTION

The above objects of the invention and others which will appear as the discussion below proceeds are provided by the present invention, according to which a test instrument implementing the present invention is provided for connection to a node of a network. Such a node may be an originating source or an ultimate destination node, typically termed a gateway node, or may be an intermediate node.

In contrast to the van Tetering et al, Engbersen et al, and Merchant et al disclosures mentioned above, this invention provides a method for replacement of "live" traffic cells with test cells, modification of live traffic cells, or insertion of OAM cells into a live traffic cell stream by a first test instrument connected at any node forming part of an active virtual connection. Thus, this invention allows for matching the flow rate of cells transmitted by a live traffic source located within the network upstream of the test instrument containing the invention. The test cells are detected (for example) by a second test instrument at a second node. The actual transmission performance experienced by the test cells is monitored to evaluate the quality of service.

More specifically, the test instrument of the invention may be operated (1) to replace identified cells belonging to a specific virtual connection with test cells having predetermined information stored therein, such as sequence numbers, time stamps indicating the time of transmission, or cyclic redundancy checks used for the detection of bit errors within each cell; (2) to replace unassigned or idle cells with OAM-configured test cells including VPI and VCI routing information conforming to a specified virtual connection, for performing OAM functions with respect to that virtual connection; or (3) to modify the information within cells identified as belonging to a specific virtual connection, e.g., for testing the response of the network to the modifications. These modifications may include injecting single or multiple bit errors into the cell header, changing the payload type indicator and/or cell loss priority fields, and changing any of the specified fields within the cell payload. Modifications may be applied to the cell stream at a periodic rate, at a rate that is a function of the virtual connection's cell rate, to a burst of consecutive cells, or to one cell only.

The test instrument of the invention comprises a cell filter for examining headers and partial payloads of all cells transiting the network, to identify, for example, assigned cells belonging to specific virtual connections, or for identifying operations, administration, and maintenance (OAM) cells also transmitted by the network from time to time. The cell filter may be implemented by combinatorial logic, such as a number of exclusive-OR gates, or by a content-addressable memory (CAM).

In response to identification by the cell filter of a cell belonging to a particular virtual connection, a test cell from a test cell queue or a modified version of the received cell may be transmitted. An OAM-configured test cell may be transmitted in lieu of an unassigned or idle cell identified by the cell filter.

BRIEF DESCRIPTION OF THE DRAWINGS

The invention will be better understood if reference is made to the accompanying drawings, in which:

FIG. 1 shows a schematic overview of a network for ATM traffic communication;

FIG. 2 shows a schematic diagram of the mechanism whereby a node updates the VPI and VCI information of each ATM cell it processes;

FIG. 3, including FIGS. 3(a)–3(c), shows three possible methods of connecting a test instrument to the test access port of a network node;

FIG. 8 shows a schematic diagram of the principal components and steps involved in rate-matched cell identification, cell modification, cell replacement, or OAM cell insertion processing according to the invention.

DESCRIPTION OF THE PREFERRED EMBODIMENT

Figure 4:
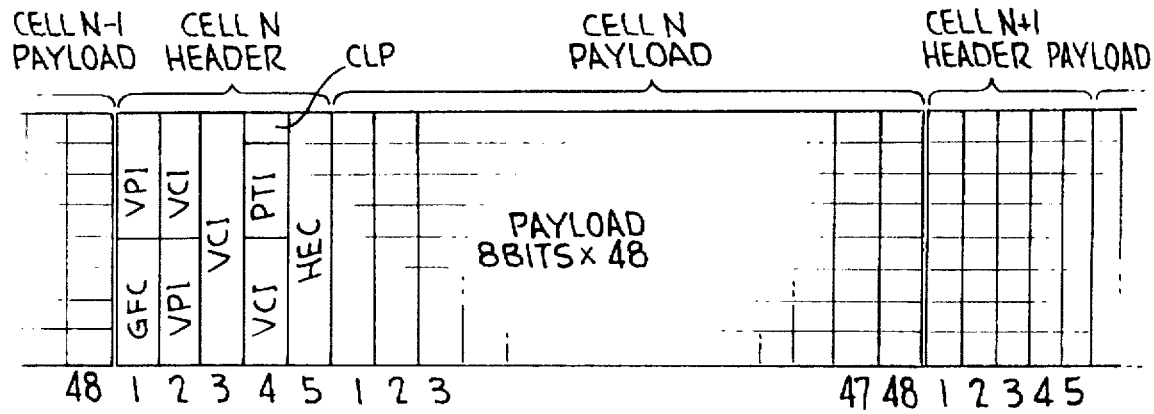
FIG. 4 shows schematically the layout of a typical ATM cell according to the standardized ATM format used in the industry.

As discussed above, the present invention relates to a test instrument and associated methods for measuring operational parameters of interest in an ATM communication network.

The instrument of the invention can be used to identify cells belonging to a specified virtual connection and either modify the identified cells, replace the cells with test cells, or augment the cells with additional OAM-configured test cells. The test cells are then transmitted over the virtual connection previously established. The test cells are typically detected at a second node, so as to monitor the pertinent parameters of their transmission.

The following provides certain additional information helpful in understanding the precise nature of the technical problems to be addressed by the invention, prior to discussion of the manner in which the invention resolves these problems.

As indicated above, asynchronous transfer mode (ATM) transmission of data (including in "data" voice, images, and video, digitized as necessary, as well as data per se) involves the segmenting of all messages to be transmitted into equal-length "cells" that are time-multiplexed over a communication link (i.e., cells from plural sources are transmitted in "cell slots" as available) at a source. Each cell of a given message is transmitted over the same sequence of nodes and links, termed a "virtual connection", to the destination of the particular message. (It will be appreciated that a "virtual connection" as used herein is referred to as a "logical channel" in certain references.) The virtual connection is established at a call setup time, begun when the originating source node transmits a first message including information as to the bandwidth required for transmission of the message. Candidate intermediate nodes then determine whether they can satisfy the bandwidth requirements of the traffic, and may negotiate these parameters if necessary. Ultimately, a virtual connection is established by storing next-node destination information in content-addressable memories (CAMs) or other circuitry comprised by each of the nodes; that is, VPI and VCI information pertaining to each segment of the virtual connection of which a given node is a component is stored at call origination, such that the routing information of each cell is updated as it passes through each of the nodes included in the virtual connection.

As the individual cells of a particular message transit the network, they may be multiplexed several times, e.g., from a relatively low speed local area network into a much higher speed wide area network. The links connecting the nodes may include conductive wires, optical fibers, and/or satellite transmission links. The streams of cells received at the ultimate destination nodes are demultiplexed and presented to the users connected to the ultimate destination node. Because each of the cells of a particular message transits the same sequence of nodes making up the virtual connection, each of the cells should arrive in its proper order. However, commonly the ultimate destination node will assemble the various cells of the message in a buffer, and strip off the header information and other non-message components of the cells, such that the entire message can be accessed in a single operation.

Rate Matching in a Virtual Connection

The transmission rates of the ATM cells in aggregate vary greatly with the medium involved in each link. At a local area network level, the transmission rate may be typically up to 10 Mbits/sec, that is, 10,000,000 bits per second, the standard "Ethernet" rate typically used for twisted-pair copper wire communication. Over high speed optical data fibers conforming to the known SONET optical network protocol, the bit rate may be up to 622 Mbits/sec. Higher rates are also planned.

Pairs of nodes in the network connected by links normally transmit a continuous stream of assigned and unassigned ATM cells at a fixed rate in both directions over the links, in order to maintain system synchronism. When there is no user traffic to be transmitted, "unassigned" or "idle" cells are transmitted. Such unassigned or idle cells may be replaced with OAM test cells according to the invention. More specifically, and according to an important aspect of the invention, cells belonging to a specific virtual connection in the continuous stream of cells passing between pairs of nodes in the network are modified, augmented with OAM cells, or replaced by test cells.

As noted above, a distinction exists between asynchronous communication, i.e., ATM, wherein various users may seek to transmit messages at any time, so that cells are assigned time slots as needed, and synchronous communication, i.e., STM, where all users retain permanently assigned time slots in a sequence thereof. In STM, it is a simple matter to perform rate-matched processing; the correct time slot is identified by counting time slots from a synchronizing indication that is regularly transmitted, and a test packet inserted in the stream at the corresponding point in time. Transmission of the test packet through the network can be traced similarly. In ATM, the cells of a particular virtual connection cannot be expected to be located in any particular time slot and must be identified by individual examination thereof.

Furthermore, as noted, intrinsic to ATM communication is the fact that cells need not be transmitted between any identified source and destination at any given time. Therefore, various important network transmission parameters, such as the average cell transfer delay, the cell delay variation, and the size and rate of bursts of cells, each to be measured with respect to a particular virtual connection, can only be meaningfully monitored if the rate of transmission of cells is not varied as a consequence of the measurement process. Accordingly, in order that a test instrument containing the invention can be employed without excessive interference with network operations, it is necessary that the cell modification or cell replacement process be performed in a "rate-matched" fashion, i.e., test cells configured as user cells must be replacements for or modifications of user cells, in order to match their rate of transmission. This process, referred to herein as "rate-matched" cell identification and cell modification or cell replacement, depending on the operation to be performed, allows known test cells to be inserted into the stream for detection elsewhere in the network for monitoring network parameters. For certain tests, the stream of user cells need not be altered; in these cases, unassigned or idle cells can be replaced with OAM-configured test cells without affecting transmission of user cells. Further, in order that the sequence of user cells is not disrupted, all cells passing through the node to which the test instrument is connected must be delayed identically, if at all.

In order to satisfy the objects of the invention mentioned above, it is therefore necessary to provide a test instrument having the capability of recognizing cells with respect to their respective virtual connection and replacing or modifying the identified cells at speeds of up to the 622 Mbits/sec and higher rates available over optically-linked nodes. The high speed recognition capability provided by the test instrument of the invention is employed for rate-matched modification, replacement, or insertion modes of operation, e.g., in order to recognize cells belonging to a virtual connection of interest and replacement thereof in the message stream by test cells.

Topology of an ATM network

FIG. 1 shows in schematic form the overall arrangement of an ATM network, exemplified by the connection of a local area network 10, that is, a number of individual computers 12 interconnected by well-known local area network hardware, to a wide area ATM network indicated generally at 22. For example, a local area network 10 may exist on a college campus or the like, as indicated. The local area network (LAN) comprises a number of individual computers 12 each connected by LAN interface units 14 to ATM LAN switches 16. The ATM LAN switches 16 provide communication between computers 12 of the LAN 10, and also identify cells intended for destinations outside the LAN 10 and convert these to ATM cells, a process which will be detailed further below. LAN 10 is connected by an ATM user network interface 18 to wide area network 22 by way of an ATM switch 20. Network ATM switch 20 is thus a "gateway" node to the wide area ATM network 22. Network 22 comprises a large number of intermediate nodes 23 connected by a large number of links 24. ATM traffic may also be originated by digital telephone equipment, video conference equipment, or other known devices.

As indicated above, various nodes 23 transmit at differing transmission rates and are connected by correspondingly-varied media, i.e., links 24. Low speed nodes may be connected by wire conductors; more commonly, and especially in new installations, optical fibers are being used to connect high speed nodes so as to enable very high speed data transmissions from point to point. Satellite links may also connect various nodes.

As noted above, as a rule, an overall message to be transmitted over the ATM network, which may be a few seconds of digitized voice or video, or data per se, is divided into a large number of cells of identical format. The individual cells are generated by an ATM switch serving as a gateway node 20. Each cell is provided with initial VPI and VCI information at the gateway node, which is used to direct it to the first intermediate node in its virtual connection. As the cells transit the wide area network 22, their VPI and VCI information is updated at each node 23 until the cells reach a similar network ATM switch serving as a destination node 28 connected to the ultimate destination of a particular message. The ultimate destination may be a computer 25, similarly part of a local area network by virtue of being connected to a LAN router 26, in turn connected to destination node 28. As indicated, the structure and operation of the ATM network is well known and is defined by a variety of different standards describing the interfaces between the various classes of nodes, links, LANs, and other components involved.

FIG. 2 shows schematically the updating of each cell at each node in a normal ATM connection. Cells arriving on an incoming line 30 reach the node 32. More specifically, streams of incoming cells are received over a plurality of links 24, and are multiplexed by a switch 29 to provide a single stream of cells via line 30, to each node 32. Each incoming stream of cells will typically include cells from a number of virtual connections. As discussed above, and in further detail below, each ATM cell includes a 5-byte header, including VPI and VCI routing information identifying the next node in the virtual connection established for the cells of each message.

The VPI and VCI of the incoming cells, shown schematically at 34, are supplied to the comparand register 35 of (typically) a content-addressable memory (CAM) 36. When correspondence between the VPI and VCI of the incoming cell and the contents of the CAM 36 is detected, the CAM outputs updated VPI and VCI routing information from data stored at 38 at call set-up with respect to each virtual connection. The new VPI and VCI then become part of the header of the outgoing cell, and are used to similarly identify the cell at the next node. A multiplexing switch 39 forming the connection of each node to a plurality of outgoing links 24 is controlled such that each cell is transmitted over the correct link to reach the next node in the virtual connection.

Thus, as discussed above, at each node in a virtual connection, the VPI and VCI of the incoming message are updated to indicate the next node in the network to which that particular cell is to be transmitted. The correspondence between the "incoming" and "outgoing" VPI and VCI information is established at call origination and stored in each node forming part of a virtual connection established for each message by exchange of a sequence of call set-up messages between an ultimate source node and an ultimate destination node. While the capability of updating the VPI and VCI routing information of each cell at each node can be provided using other circuit components, currently-preferred node designs typically use CAMs in each node to provide the VPI and VCI updating at very high speed. Nodes having this capability are within the skill of the art as of the time of filing of this application. See U.S. Pat. Nos. 5,414,701 to Shtayer and 5,422,838 to Lin.

In the embodiment shown, the nodes themselves each comprise routing intelligence, that is, for responding to call set-up messages to establish virtual connections. However, the invention would also be useful in evaluating a network designed such that one or more central routers determined the sequence of nodes and links to be traversed by the cells of each message, i.e., to define the virtual connections.

Methods of Test Access

FIGS. 3(a)–3(c) show three different methods whereby a test instrument according to the invention can be connected to a conventional preexisting node 42 of an ATM network, using, in this example, electrical wire connections. As shown, node 42 is connected to two incoming lines 44 and 46 and two corresponding outgoing lines 48 and 50, respectively. As shown in FIG. 3(a), the test instrument 54 may be connected to two test port terminals 52 in a "monitor" mode of operation of the test instrument of the invention. In this mode, network service is undisturbed; the test instrument simply monitors traffic through the node and may perform various tests, maintain network operation statistics, and the like, without affecting flow of traffic.

In an "emulate and terminate" mode shown in FIG. 3(b), the test instrument effectively terminates incoming line 46 and originates traffic over transmit line 48. In this mode of operation, the test instrument effectively takes the node out of service.

Finally, in a third "through" mode, shown in FIG. 3(c), the test instrument is interposed in the traffic path between the incoming lines 44 and 46 and the corresponding outgoing lines 48 and 50. Rate-matched cell identification and modification, and replacement and insertion of test cells according to the present invention, are performed with the instrument connected in the "through" test access mode of FIG. 3(c). For purposes of the present invention, the test instrument can be interposed in the cell flow path before or after the updating of VPI and VCI information at each node, although it will be apparent that the VPI and VCI information supplied to the instrument will vary accordingly.

In the "through" mode, all traffic passing through node 42 is delayed by a fixed period of time, typically an integral number of cell time slots, varying with the rate of transmission of the cells at that particular point in the network, to enable test instrument 54 to carry out the appropriate processing steps. It will be apparent that it is desirable that all traffic be delayed identically so that the order of cell transmission is not disturbed. Further, it is important that the delay be as short as possible.

Note that networks linked by high speed fiber optic lines may be accessed in a conceptually similar way, although there are no currently standardized methods for providing test access to nodes in fiber optic networks.

In each of FIGS. 3(a)–3(c), and below, the ports at which the test instrument 54 receives traffic from the node are labeled RX1 and RX2, while the ports through which the test instrument transmits data back to the node for transmission over the network are referred to as TX1 and TX2.

Format of an ATM Cell

FIG. 4 shows the format of the typical ATM user cell. As discussed above, each ATM cell includes 53 8-bit bytes, that is, includes a 5-byte header and 48 bytes of payload. The payload may contain user data in the case of normal user cells or control information, in the case of operations, administration, and maintenance (OAM) or resource management (RM) cells. The individual cells in a stream of cells may be separated by additional cell delineation bytes of predetermined format, depending on the medium of transmission being employed.

Within a LAN, for example, and at the ATM User Network Interface (UNI) 18 (FIG. 1), the first byte of the header includes four bits of generic flow control (GFC) information, followed by four bits of virtual path identifier (VPI) information. Within the wide area network, the GFC bits are typically replaced with four additional VPI bits. VPI information also makes up the first four bits of the second byte, which is followed by four bits of virtual channel identifier (VCI) information. All eight bits of the third byte of the header include VCI, as do the first four bits of the fourth byte. The 24 (or 28) total bits of VPI and VCI together comprise routing information for the cell. Where the cell is an unassigned or idle cell, the VPI and VCI bits are all set to zero; the test instrument of the invention is capable of recognizing this and inserting an OAM-configured test cell in place of an unassigned or idle cell. The fifth, sixth, and seventh bits of the fourth byte of the cell header are payload type identifier (PTI) bits, which typically indicate whether the payload of the cell includes user data, whether the segments of the network through which the cell has traveled have experienced congestion and the like, or whether the cell is a "OAM" cell, used for control of network operation, administration, and maintenance. The last bit of the fourth byte is a cell loss priority (CLP) bit, a "1" indicating that the cell is subject to discard in the event of network congestion or the like. Where the VPI and VCI fields are all zeroes, the CLP bit differentiates between idle and unassigned cells. Finally, the fifth byte of the header includes header error control (HEC) data used to reconstruct the header if a single bit error is detected within the cell header by any of the nodes along a virtual connection.

Again, as discussed above, the VPI and VCI information included in the header of each ATM cell is updated at each node as the cell transits its virtual connection from its originating source node to its ultimate destination node. More specifically, each node stores VPI and VCI information corresponding to each virtual connection then being supported. When the sequence of nodes making up the virtual connection is determined at call origination, the VPI and VCI information of the incoming cells is stored by each node in association with the corresponding VPI and VCI information to be written into the header of each cell, so as to update the network routing information of each cell as each node is transited.

The test instrument of the invention is therefore capable of examining incoming cell VPI and VCI information to identify the cells belonging to particular virtual connections, e.g., for replacing such cells, modifying one or more bits thereof, or augmenting the stream of cells with OAM-configured cells, thus providing a stream of test or OAM cells for being similarly identified by a second instrument elsewhere in the virtual connection. In this case, the test instrument of the invention is connected in the through mode of FIG. 3(c), wherein all traffic through a particular node passes through the test instrument. For example, some or all of the cells from a particular virtual connection may be detected and replaced with test cells, to monitor the quality of service and other characteristics between particular nodes in the network. Alternatively, unassigned cells may be identified and replaced by OAM-configured cells to avoid impacting an in-service virtual connection, e.g., to measure cell error ratio or the like. The cell payload type information included in the PTI field can be examined by the instrument of the invention at each test access point to differentiate between user and OAM cells.

This facility is employed by the invention, e.g., to measure network performance with respect to a particular virtual connection, e.g., cell loss ratio, cell misinsertion rate and the like.

Contrasting Switched and Permanent Virtual Connections

The VPI and VCI information is normally arbitrary, in that it cannot be analyzed to identify the ultimate source of the cells, to identify the position of a cell in a sequence of cells, or the like. The VPI and VCI information also does not include a virtual connection identifier per se. However, it will be appreciated by those of skill in the art that certain VPI and VCI values are "reserved", e.g., for call origination messages. Candidate nodes identify the reserved VPI and VCI of call origination messages in order to respond to the call set-up query, i.e., to determine whether they can serve as part of a proposed virtual connection. Certain "permanent" virtual connections (as opposed to "switched" virtual connections established at call origination, as described) may also be established by permanent VPI and VCI assignments. Further, individual service providers may employ parts of the VPI field to indicate levels of service and the like.

Test Instrument Functional Description

Figure 5:
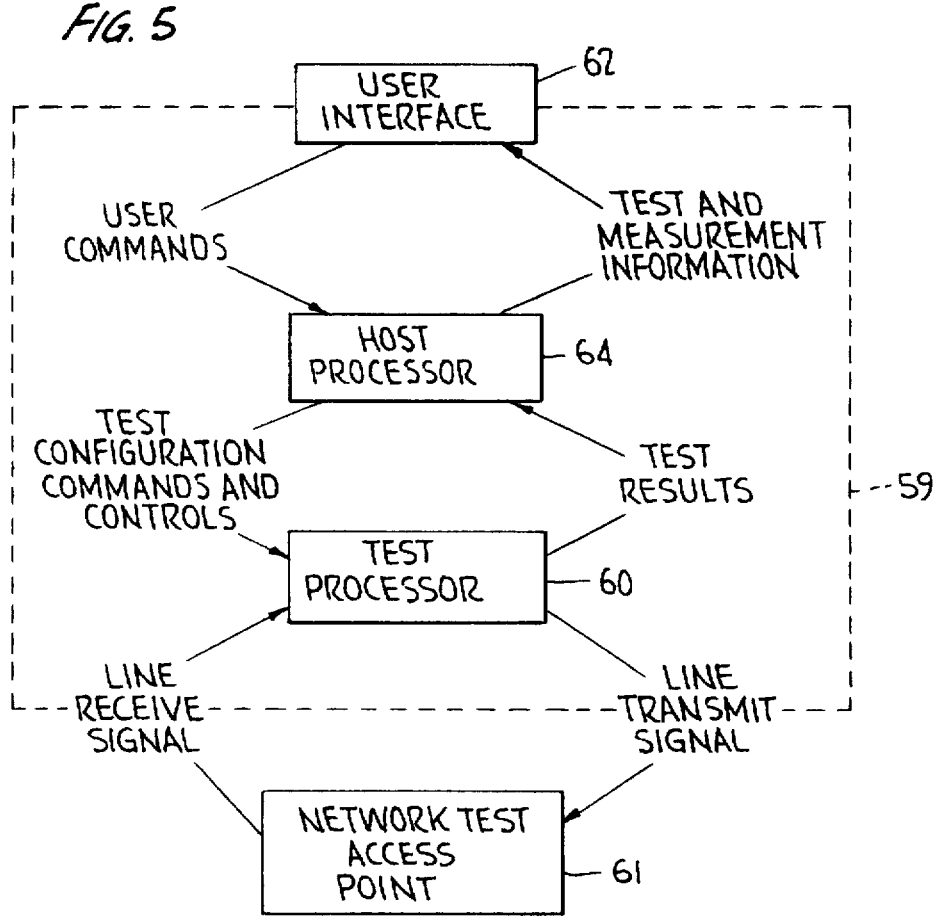
FIG. 5 shows schematically the components of a test instrument according to the invention.

FIG. 5 shows a block diagram of the principal components of a test instrument 59 for carrying out the functions provided according to the invention. The processing steps required to carry out the various tests made possible according to the invention are performed in main part by a test processor 60 monitoring cells received from an associated node and transmitting a stream of user and test cells to the node. The test instrument is connected to the network via a network test access point 61, such as the test port 52 of FIG. 3(a). When desired, the test access point may include dual transmit and receive ports to allow bidirectional cell monitoring, as shown by FIG. 3(c). The same functionality can be provided in many cases by a single receiver port and single transmitter port test instrument as well.

The specific operations to be carried out by the test processor 60 are controlled by a user providing commands by way of a user interface 62 which is in turn connected to test processor 60 by a host processor 64. The host processor 64 provides the user with, for example, the ability to specify a virtual connection of interest, and to specify the type of test to be performed. The host processor also provides substantial processing capability with respect to test results and the like received by way of test processor 60. Test instruments including a user interface, a test processor, and a host processor are generally known; the invention in this case generally resides in the specific functions provided by and structure of the test processor 60.

As discussed, the test processor 60 identifies specific cells in a stream of cells by comparison of the VPI and VCI fields of each cell to information stored in the test processor. The stored information is provided by the user, who (for example) would key the information into the host 64 by way of a keyboard comprised by the user interface 62. The user in turn may obtain the VPI and VCI information from a system administrator, who assigns this information to each new virtual connection. The instrument may also store VPIs and VCIs received for a period of time, building a list of active connections. The user may then select one for analysis. A virtual connection may also be established specifically in order to test specific aspects of network operation, and the VPI and VCI then communicated to the user at the test instrument.

Test Processor Block Diagram

Figure 6:
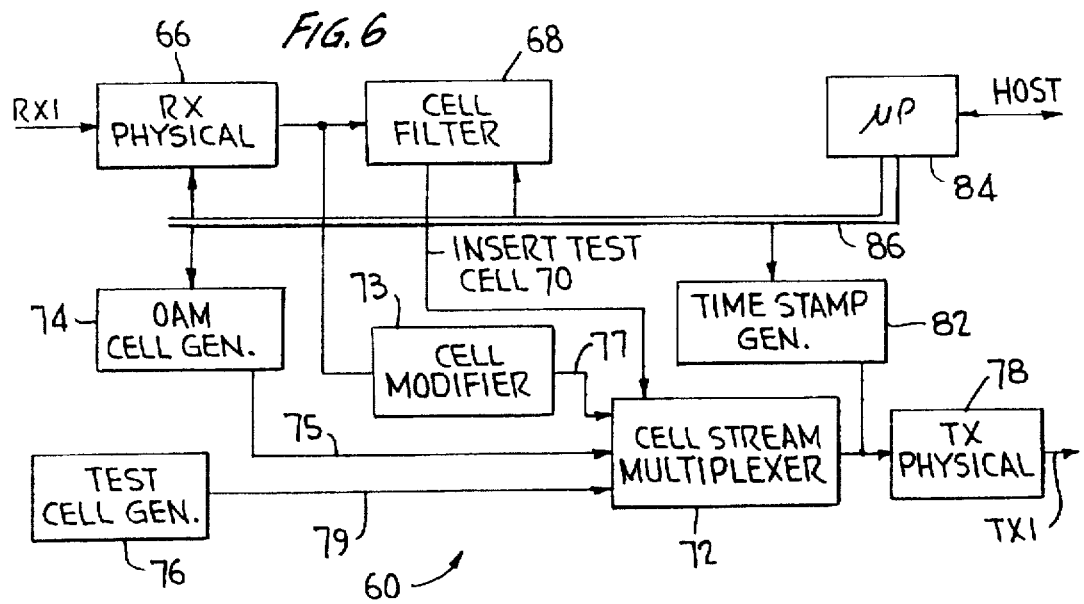
FIG. 6 is a block diagram of the principal components of the test processor of a test instrument according to the invention.

FIG. 6 shows a functional block diagram of the principal components of the test processor 60. The test processor examines each incoming cell and carries out appropriate action in real time, that is, without significant delay of cells, long term storage, or the like. In a presently preferred embodiment, the test processor 60 comprises a "real-time embedded system" comprising dedicated hardware, one presently-preferred implementation being shown in further detail in FIG. 8.

Incoming cells are received by a receiver 66. The VPI and VCI fields of each cell are compared by a cell filter 68 to VPI and VCI information pertaining to a virtual connection of interest, as supplied by the user via the host 64, connected in turn to a microprocessor 84. For example, traffic between a particular source and a particular destination may have been identified as including an unacceptable cell error ratio or the like. Accordingly, the cell filter 68 would be supplied with the VPI and VCI information of the corresponding virtual connection, for comparison to that of incoming cells, to locate those belonging to the particular virtual connection of interest.

Where correspondence is detected, such that a cell belonging to a particular virtual connection is identified, an Insert Test Cell signal indicated at 70 is provided by the cell filter 68 to a cell stream multiplexer unit 72. The cell stream multiplexer unit 72 selects a test cell from one of several buffers or queues. For example, an OAM-configured cell provided by an OAM cell generator 74 to cell stream multiplexer 72 may be selected for insertion. That is, the inserted cell may include PTI information identifying the cell as an OAM cell (see FIG. 4), or may be configured as a normal user cell, depending on the specific test to be carried out. If a test cell configured as a normal user cell is to be transmitted, multiplexer 72 may select the test cell from test cell generator 76. One or more bits of the identified cell may also be modified by a cell modifier 73 connected to multiplexer 72, to configure that cell as a test cell.

Cell stream multiplexer 72 is supplied with the stream of cells passing through the cell modifier via a first line 77, with user-configured test cells to be inserted in place of identified cells in the stream of test cells from the test cell generator 76 via a second line 79, and with OAM-configured test cells from generator 74 via a third line 75. In the absence of the Insert Test Cell signal 70, that is, unless a test cell is to be interposed into the stream of cells, the stream of cells passes unaltered from the receiver 66 through cell modifier 73 to cell stream multiplexer 72. The stream of cells flows from the multiplexer 72 to a transmitter 78, where the stream of cells is reconfigured for serial transmission as necessary and returned to the network via port TX1.

The particular test operation to be performed is controlled responsive to user commands provided to host processor 64 (FIG. 5) connected in turn to microprocessor 84, communicating control signals to the principal components of the test processor via bus 86. For example, where a time stamp is to be provided as part of measurement of the round trip travel time of a test cell, this information is inserted into the payload of the test cell by a time stamp generator 82 connected downstream of the multiplexer 72, as shown. See co-pending Ser. No. 08/560,285. The test instrument of the invention may be employed for measuring various statistics of interest in monitoring network operation. See co-pending Ser. No. 08/563,552 for further details of this aspect of the invention.

The cell filter 68 can be implemented in at least two ways. The basic function of the cell filter is to compare stored VPI and VCI information, for example, representative of cells belonging to a particular virtual connection, to the VPI and VCI of each incoming cell. Where cells belonging to a particular virtual connection need simply be identified, e.g., for replacement or modification, or for measurement of the size and rate of bursts of cells from a particular virtual connection (see copending Ser. No. 08/560,286, the cell filter may be implemented using combinatorial logic and associated registers, as shown in FIG. 8 and discussed in detail below. Where one or more characteristics of the cells are to be monitored, or where cells from a number of virtual connections are to be identified, a content-addressable memory (CAM) is the preferred implementation of the cell filter 68. See copending Ser. No. 08/563,552.

The OSI Seven Layer Model

The receiver 66 and transmitter 78 in FIG. 6 both perform functions usually termed part of the "physical layer" of a communication device. The "physical layer" nomenclature refers to the first layer of an industry standard model of communications referred to as the "Open Systems Interconnection" (OSI) model. According to the OSI model, communications functions are divided between seven "layers", each comprising hardware and software and having standard interfaces, defined such that the components (hardware and software) implementing each layer can be replaced and upgraded as necessary without affecting the others. The principal functions of the physical layer are deframing, physical overhead removal, and cell delineation. The physical layer thus identifies the cells within the continuous bit stream received from the node and presents these cells to the ATM layer. Layer 7, the highest layer in the OSI model, is referred to as the application layer, and may for example constitute software whereby a human user indicates that a message is to be sent. Layers 6, 5, 4, and 3 are increasingly-detailed layers the specifics of which are not of direct relevance to the present invention. The ATM protocol processing occupies the link layer, layer 2.

Figure 7:
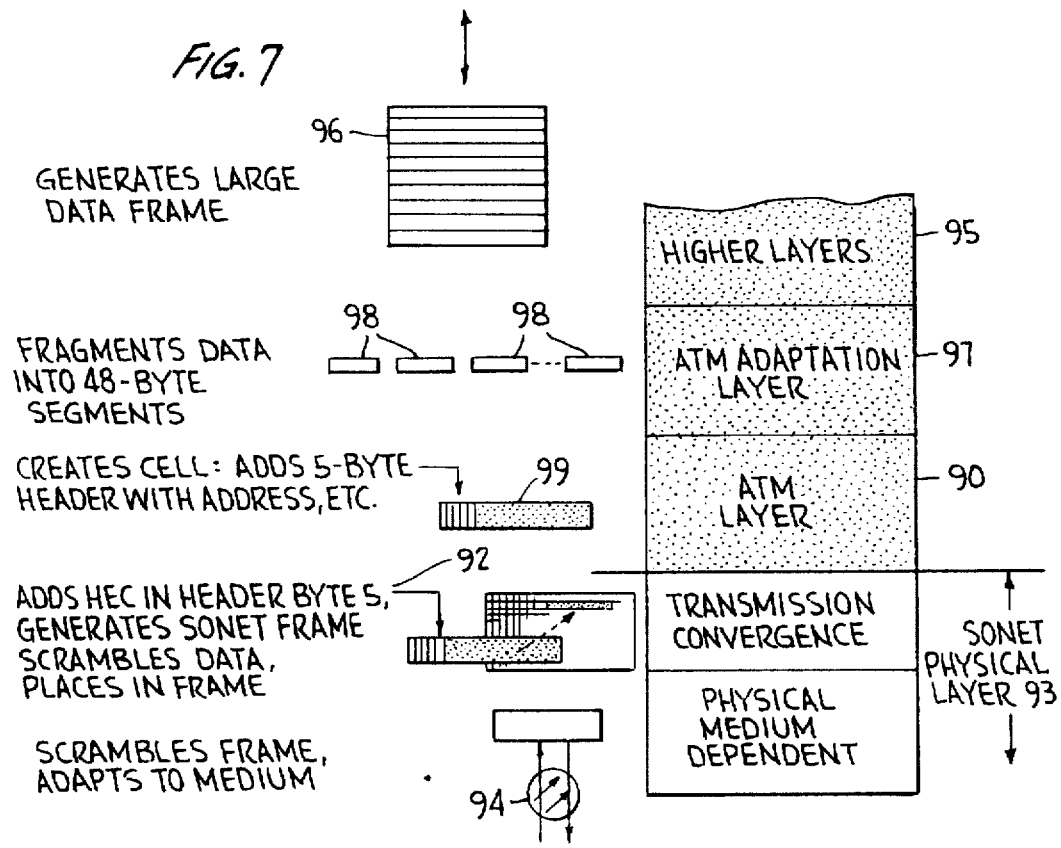
FIG. 7 shows a diagram indicating the way in which ATM communication conforms to the industry-standard open systems interconnection (OSI) model.

FIG. 7 shows an example of the application of ATM within the OSI model. As noted, the lowest layer, layer 1, is the physical layer. In the example of FIG. 7, this physical layer is exemplified as an optical fiber transmitter indicated at 94. At the second or ATM layer 90, ATM cells are created and formatted according to the particular protocol employed by the medium. In this example, the cells are formatted into "frames" conforming to a SONET protocol used commonly at the physical layer for optical fiber transmission. More specifically, as indicated further in FIG. 7, the higher layers 95 generate a large data frame 96; that is, the message to be transmitted is provided by the higher layers 95. At the ATM adaptation layer 97, the frame 96 is fragmented into 48-byte segments, corresponding to payloads of cells, as indicated at 98; headers are added at 99, providing the VPI and VCI address information, and completing the cells. The FIG. 7 example presumes the cells are to be transmitted over optical fiber according to the SONET protocol. Accordingly, the cells are placed in a SONET frame at 92 (whereby a number of cells may be transmitted between SONET nodes, without individual routing, for example) and transmitted by transmitter 94 at the physical layer 93, as indicated.

Correspondingly, when a cell is received by the test instrument, the physical layer device of the node organizes the serial stream of bits transmitted by the physical medium as an 8 bit wide by 53 byte long cell as shown in FIG. 4.

Rate-Matched Cell Modification, Replacement, and Insertion

As noted, user cell modification, replacement of user cells identified as belonging to particular virtual connections, and replacement of unassigned or idle cells with test cells, which may be configured as OAM cells, all to be performed in an appropriately rate-matched manner, are particular objects of the invention. FIG. 8 shows a detailed functional block diagram of one implementation of the test processor employed to perform the relevant functions, as well as the flow of cells and control signals. The FIG. 8 implementation corresponds generally to the block diagram of FIG. 6; it will be recognized that numerous alternatives are possible.

As shown in FIG. 8, the incoming data is received by a physical layer receiver 66. The data is supplied to a cell identification and filtering unit 68. Where correspondence between a cell and stored VPI and VCI information is detected, a "VC-Detected" control signal on line 100 is provided to a cell stream multiplexer input selector 136. More specifically, selected VPI and VCI values are provided at 102, e.g., by the user via microprocessor 84, and stored in register 106. (Where an unassigned or idle cell is to be replaced, these values are all zeroes, as noted.) The cell identification and filtering unit 68 compares the stored cell identification information to the corresponding fields of each cell received. When correspondence is detected, the VC-Detected signal is provided on line 100 and triggers, for example, modification of the cell or its replacement by a test cell. The cell identification and filtering unit 68 can similarly identify unassigned or idle cells, and trigger insertion of an OAM-configured test cell in their place.

In the embodiment shown in FIG. 8, the cell filter 68 is implemented by combinatorial logic, that is, discrete circuit elements, in this case 32 exclusive-OR gates 104. As is well known by those of skill in the art, the OR of the outputs of a set of exclusive-OR gates provide a positive active-low output only when all of the inputs to the exclusive-OR gate match a specified pattern. In this application, the selected VCI/VPI values are stored in a first input register 106 and form one set of inputs supplied to the exclusive-OR gates on a 32-bit input bus 108. The corresponding VPI and VCI values from the incoming cells are stored in a second input register 110 and are supplied by a second 32-bit input bus 112 to the exclusive-OR gates 104. When all of the bits stored in the two registers 106 and 110 match, the exclusive-OR gates 104 provide 32 identical output signals to an OR gate 114, which in turn provides a one-bit output signal to a latch 116. The "low" output of latch 116 comprises the VC-Detected signal 100, and is also supplied as a Field Modification control signal 118 to a cell field modifier circuit 120, and to a user cell counter 111.

The incoming cells are also supplied by way of line 122 to a pipelining first-in first-out (FIFO) buffer 124, where they are stored for a fixed number of cell slots. In the event the cells are not to be replaced or modified, they are supplied from buffer 124 via "through-mode cells" line 126 to cell stream multiplexer 128. Multiplexer 128 is a switching device for supplying the cell to be transmitted in each cell slot to transmitter 78.

Whether a particular identified cell (or all of a group of similar cells) is to be modified or replaced is controlled by a Fields to Modify signal provided by microprocessor 84 on line 130 responsive to user commands. Where one or more received cells are to be modified responsive to the Field Modification control signal 118, and responsive to the Fields To Modify signal on line 130, the cell then stored in the pipelining FIFO buffer 124 is directed to the cell field modifier circuit 120 by way of a Cells to Modify line 132. One or more bits of the incoming cell are accordingly set, reset, or inverted by the cell field modifier circuit 120 and provided as a modified cell on line 134 to multiplexer 128.

By comparison, where the identified cells are to be replaced with test cells, multiplexer 128 may select an appropriate test cell from several sources, responsive to an Input Selection signal provided by a cell stream multiplexer input selector 136, again responsive to a test selection made by the user. For example, where an unassigned cell is detected by the cell filter 68, as indicated at 138, an OAM-configured test cell can be placed in the cell stream in place of the unassigned cell. OAM-configured test cells can also be inserted into the cell stream at regular intervals measured by counter 111, which maintains a count of the user cells detected between OAM cells corresponding to a particular virtual connection. A test and/or OAM cell generator 140 provides a sequence of test cells, which may be configured as user or OAM cells, to a test and/or OAM cell FIFO queue unit 142. The test and/or OAM cells are provided to the multiplexer 128 via line 144. Alternatively, a dummy test cell can be provided from a buffer 146 to the multiplexer 128, in the event no test cell is currently available from the queue unit 142.

Where, for example, a particular virtual connection has been identified as experiencing problems, the VPI and VCI fields of each cell are examined by the cell identification filter 68 to identify cells from that particular virtual connection. The "VC-Detected" signal indicating detection of a match is provided to cell stream multiplexer input selector 136. The cell stream multiplexer input selector 136 is also supplied with a Cell Available signal on line 137 from test/OAM cell FIFO queue 142. Thus, when both the VC-Detected and Cell Available signals, on lines 100 and 137 respectively, are active, the multiplexer 128 injects a test cell from the test cell queue 142 in place of the corresponding user cell in the stream of through mode cells on line 126, thereby replacing the user cell.

Similarly, if user input has been provided indicating that OAM-configured test cells are to be transmitted when possible, when both the Unassigned Cell Detected and Cell Available signals, on lines 138 and 137 respectively, are active, the multiplexer 128 injects an OAM-configured cell from the OAM cell queue 142 in place of the corresponding unassigned cell in the stream of through mode cells, thereby inserting an OAM-configured test cell into the cell stream. OAM cells can also be transmitted at regular intervals determined by counter 111, as discussed further below.

As noted, dummy test cells stored in buffer 146 are selected by multiplexer 128 to replace dropped user cells when the test and/or OAM cell generator 140 is not capable of cell generation at the rate of the virtual connection being dropped.

Finally, in the absence of either of the VC-Detected or Unassigned Cell Detected signals, multiplexer 128 passes the through mode received cells from the cell pipelining FIFO buffer 124 unaltered to the physical layer transmitter 78.

It will be appreciated that the function of the cell filter 68 in the embodiment shown in FIG. 8 is simply to identify those received cells having VPI and VCI information conforming to stored corresponding data, or similarly to identify unassigned or idle cells. In this circumstance, the exclusive-OR embodiment of the cell filter 68 is adequate. Where, however, a number of virtual connections may require simultaneous monitoring, or where several characteristics of the cells are to be monitored, as in the case of the statistics processor discussed in co-pending Ser. No. 08/563,552, the cell filter is preferably implemented by a content-addressable memory (CAM). As is understood by those of skill in the art, a CAM has the capability of simultaneously comparing input data supplied to a comparand register to a number of stored values and outputting correspondence signals and/or data responsive to the comparison. Use of a CAM therefore provides significant additional flexibility to the instrument of the invention and is preferred in numerous embodiments thereof, depending on the exact functions to be performed by the instrument.

In some cases, alteration of one or more bits of a particular cell or cells within a virtual connection constitutes that cell a test cell for the purposes of the present invention. For example, a header bit may be altered to test the next node's header error detection and correction facility. To this end, a cell field modification unit 120 is provided. Cell field modification unit 120 is connected between cell pipelining FIFO buffer 124 and the cell stream multiplexer 128 as shown. Each cell received by the test processor is stored in cell pipelining FIFO buffer 124 for a fixed number of cell slots, while the cell is simultaneously examined by cell filter 68, until it is time for the cell to be transmitted. An altered or replacement test cell is transmitted, as above, or the cell stored in cell pipelining FIFO buffer 124 is transmitted unaltered. As noted, one or more bits may be altered by the cell field modification unit 120, where this is sufficient to constitute the modified cell a suitable test cell.

Finally, as noted, a continuous stream of ATM cells is transmitted between each linked pair of nodes at any given time, each cell occupying a cell slot, that is, a unit of time. In order that the system can remain synchronized, it is important that a continuous stream of cells is transmitted. When there is no user traffic to be transmitted, "unassigned" or "idle" cells may be transmitted; such unassigned and idle cells include an indication in their headers that they do not contain user data, i.e., their VPI and VCI are all zeroes. Such cells are the first choice for replacement by OAM-configured test cells according to the invention. Use of OAM-configured test cells is discussed further below.

Summarizing the operation of the instrument according to the invention, all cells passing through a particular node are examined by the cell filter 68. The cells of one or more virtual connections are replaced by test cells, may have one or more bits modified, may have a time stamp inserted, may be augmented with or reconfigured as OAM cells, may have individual identifiers inserted in their payloads, or the like. In order that network synchronism is not disturbed, all cells passing through the node are delayed by an equal finite deterministic period, typically four cell slots, to provide time, for example, for replacement of identified cells with test cells according to the invention. For this reason, cells to pass through the node unaffected, as well as cells to be modified, are stored in the cell pipelining FIFO buffer 124 so that they can be transmitted at the appropriate time.

Depending on the specific test cell to be inserted into the cell stream, as noted above, either a single bit of a received cell may be altered, multiple bits may be altered, or the entire cell may be dropped and replaced with a predetermined test cell. Commonly, but not in every case, such predetermined test cells are configured as OAM cells, as OAM cells can be inserted into an in-service virtual connection without affecting transmission of user cells. Test cells may also be configured as user cells, or as resource management (RM) cells, depending on the test to be performed. RM cells may be transmitted for recognition at a virtual source/virtual destination (VS/VD)-capable node within the network. A VS/VD-capable node has the ability to loop-back RM cells (i.e., transmit it back to the node from which it was received). Various tests can therefore be carried out using a single instrument according to the invention by judicious selection of RM-configured test cells. Accordingly, when a particular cell is identified in the stream of cells by the cell identification filter 68, the cell, having been simultaneously stored in the cell pipelining FIFO buffer, may be altered in a cell field modification unit 120 in response to a field modification control signal 118, or the cell may be discarded entirely and replaced responsive to VC-Detected signal 100. In the latter case, a test and/or OAM cell may be selected from a queue thereof stored at 142, having been generated by a test and/or OAM cell generator unit 140. In response to the control signals received, the cell stream multiplexer 128 selects for each cell slot the original cell stored in the cell pipelining buffer 124, an altered cell received from cell field modification unit 120, a test cell or an OAM cell received from the queue 142, or a dummy test cell from buffer 146. The selected cell is directed to the transmitter 78 for re-serialization and transmission to the node for being released into the network in sequence.

Important features of this aspect of the invention are detection of specific cells (either identification of cells belonging to a virtual connection of interest, or unassigned or idle cells) by the cell filter 68 and control responsive to user instructions of the options of passing the cell through the instrument unaltered, modifying the cell, or dropping the cell and inserting a test cell. These functions are selected responsive to the field modification control signal 118 and VC-detected control signal 100 provided to the multiplexer 128, both responsive to user input.

Use of the Invention in Monitoring Network Performance

As mentioned above, a number of parameters describing network operation are of interest, in particular in monitoring whether the service being provided meets quality of service standards. Parameters of network operation relevant to such determinations include measurement of cell transfer delay, cell delay variation, cell error ratio, cell loss ratio, and cell misinsertion rate, among others.

The rate-matched cell identification, replacement, modification, or insertion process according to the invention just discussed is employed in measuring many of these parameters. For example, a particular virtual connection may include a very large number of cells being transmitted between a particular originating source and an ultimate destination. It is not possible to measure the cell transfer delay, for example, without identifying a particular one of the cells and measuring its particular delay. For this reason, the test instrument containing the invention is provided with the ability to replace the cells from that virtual connection with test cells including identifiers, time-of-departure time stamps, and sequence numbers. A second test instrument can identify individual test cells, for example, in order to append a time-of-arrival time stamp, and measure the cell transfer delay by computing the difference between the two time stamps. Details of one implementation of use of the instrument to measure the round trip travel time of cells are found in copending Ser. No. 08/560,285. A number of similar tests can be performed with respect to successive cells from a particular virtual connection and the results compared to measure the cell delay variation, a very important parameter in voice and video transmission, as noted.

The test cell is identified at a second node of interest by a second generally similar test instrument similarly monitoring the headers of each cell for detecting cells belonging to the virtual connection and then examining the header, for example, and optionally part of the payload, for identification of a test or OAM cell. For example, a stream of user cells flowing through the test instrument of the invention may be modified, using the cell field modifier circuit, by setting all of the cell loss priority (CLP) bits to 1.

Other modifications are also possible. For example, as noted, individual cell identifiers may be added to the payloads of test cells and detected by a similar instrument, effectively tracking individual cells through the network. In order to avoid the necessity of differentiating such test cells configured as user cells from actual user cells, testing may be performed with respect to particular virtual connections only when they are out of service, i.e., fully configured but not in immediate use for transmission of user cells.

Overview of OAM Performance Management Processing

As discussed above, certain cells provided in the network are termed OAM (operations, administration, and maintenance) cells. Several types of OAM cells are defined—performance management (PM), fault management (FM), and others. Bits in the PTI field of the header are set to identify the OAM cells for identification by the nodes. These OAM cells accordingly do not contain user data, but include payload information provided for other purposes.

As noted, OAM cell types include performance management (PM), fault management (FM), and other types. The different types of OAM cells are detected and treated differently by the nodes. For example, OAM-FM cells are removed by the nodes from the path traversed by user cells; accordingly, for example, measurements of cell delay determined using test cells configured as OAM-FM cells would not accurately track the cell delays experienced by user cells. OAM-PM cells, by comparison, transit the same path as user cells, and measurement made using test cells configured as OAM-PM cells are representative of transmission of user cells.

OAM-configured test cells may be transmitted, e.g., between intermediate nodes, to measure cell loss ratios at regular intervals between the selected nodes. OAM-PM cells would normally be preferred for this purpose. For example, an instrument according to the invention connected to a given node may transmit an OAM cell after every, say, 256 user cells belonging to a specified virtual connection, and a second instrument connected to a receiving node may count the cells received with respect to that virtual connection between detection of OAM cells. If the result is not 256, it is apparent that a cell has been lost or misinserted.

More specifically, user cell counter 111 may be employed to count the user cells received with respect to a particular virtual connection and cause multiplexer 128 to select an OAM-configured test cell for transmission at regular intervals, e.g., every 256 cells, as noted. In many circumstances, the cells immediately following the 256th user cell will also be user cells, and an unassigned or idle cell, as normally preferred for insertion of OAM-configured test cells, will not be available. In order to avoid interference with user traffic, the 256th and all subsequent user cells may be delayed by one cell slot, to permit insertion of the OAM cell. The "lost" cell slot can be recovered upon detection of the next idle cell. However, in busy virtual connections, this may take some time. An alternative is to transmit an OAM cell in place of the next detected idle cell, together with an indication of the actual number of user cells counted by counter 111 in the interval since transmission of the prior OAM-configured test cell. The receiving instrument can then compare the count value provided with its own similar count of the cells received from that virtual connection between successive OAM cells.

Use in Measuring Round Trip Time

Those of skill in the art will be aware that there are available "virtual source/virtual destination" (VS/VD)-capable nodes, wherein intermediate nodes can be operated in some respects as if they were originating source or ultimate destinations, effectively segmenting the network. The round trip travel time can be measured between such VS/VD-capable nodes, essentially using the process just described. That is, two test instruments according to the invention are connected to two VS/VD-capable nodes of interest, and cells including time stamps are originated at a first VS/VD-capable node, looped back at a receiving VS/VD node, and detected at the first to measure the round trip travel time of the message between the two nodes. The capability of identifying specific cells provided according to the present invention is essential to such test capability. Round Trip Time (RTT) can also be measured between an ATM source and a virtual destination, such as a VS/VD-capable node or between an ATM virtual source, again a VS/VD-capable node, and its destination. Further details of RTT measurement are found in copending Ser. No. 08/560,285.

Conclusion

It will thus be appreciated that the instrument of the invention, having the capability of identifying individual cells in a stream of ATM cells by examining the cell header information of each, is therefore enabled to perform operations not possible in the prior art. More specifically, the ability to identify cells from a particular virtual connection and modify, replace, or augment them with test or OAM cells recognizable elsewhere in the network by a second test instrument, or looped-back by an OAM-capable node, allows the transmission of individual cells to be monitored. This ability in turn allows direct measurement of cell transfer delay and other important parameters, even though a particular virtual connection may include thousands of cells, none of which indicate under normal circumstances their position in the sequence of cells transmitted over the virtual connection. In absence of the capability of the instrument of the invention to add individual identifiers to the cells of particular virtual connections, it would not be possible to measure actual transmission parameters with respect to individual ATM cells. By comparison, in STM, where cells from a particular connection are constrained to occupy specific time slots in an overall sequence, there is no need to identify cells belonging to an individual connection by examining each cell passing through a node.

While a preferred embodiment of the invention has been described in detail, and numerous examples of its operation have been given, it will be appreciated by those of skill in the art that these are merely exemplary and that other implementations of these and various further aspects of the invention are also within its scope and extent. The invention is therefore not to be limited by the above exemplary disclosure, but only by the following claims.

What is claimed is:

1. A method for measuring characteristics and testing the integrity of asynchronous transfer mode (ATM) communication over a virtual connection between a particular source of traffic and a particular destination of said traffic in a communication network, said network comprising a plurality of nodes and links connecting a plurality of sources and a plurality of destinations, wherein traffic to be transmitted between said sources and said destinations is divided into equal-length cells, each cell including a header including message type and routing information, and wherein individual sources are connected to said network by gateway nodes, such that traffic to be transmitted from individual sources is assembled at said gateway nodes into sequences of one or more cells, each cell of a message being transmitted from said gateway nodes, through a sequence of one or more intermediate switching nodes defining a virtual connection of said message, to a destination node connected to the destination of the message, comprising the steps of:

interposing a test instrument in the traffic flow path at a node to be traversed by cells being transmitted over a virtual connection to be tested between a particular source of a message and a particular destination of said message, such that all cells traversing said node traverse said test instrument;

providing said test instrument with information identifying cells of a virtual connection to be tested thereby;

comparing said identifying information to header information of each cell traversing said test instrument, in order to identify all cells corresponding to said virtual connection to be tested, and such that the transmission of all cells traversing said node is delayed by a fixed amount of time;

replacing one or more of the identified cells in the sequence of cells traversing said node with test cells having known characteristics; and monitoring the transmission of said test cells through said network.

2. The method of claim 1, wherein said step of monitoring transmission of test cells through the network includes the step of measuring one or more of cell transfer delay, cell delay variation, cell error ratio, cell loss ratio, cell misinsertion rate, and round-trip travel time.

3. The method of claim 2, comprising the further step of interposing a second test instrument in the traffic flow path at a second node, said second test instrument being capable of identifying test cells and retransmitting said identified test cells to said first node as a step in measuring the round-trip travel time thereof.

4. The method of claim 1, wherein a substantially continuous stream of cells of fixed length is transmitted between nodes in ordinary operation of said network, such that idle or unassigned cells may be transmitted in the event no user traffic is available for transmission at a given time, and wherein said comparison step includes the step of identifying unassigned or idle cells in said stream, followed by the step of inserting test cells configured as operation, administration, and management cells, including predetermined information for analysis of said network, in place of said unassigned or idle cells.

5. The method of claim 1, wherein said replacing step comprises modifying one or more predetermined portions of a cell to include predetermined information.

6. The method of claim 1, wherein said step of comparing said identifying information to header information of each cell traversing said test instrument is performed by providing at least a predetermined portion of said header information of each cell to a comparand register of a content-addressable memory comprised by said test instrument, and wherein said content-addressable memory stores associative data to be output responsive to said header information.

7. The method of claim 1, wherein said step of comparing said identifying information to header information of each cell traversing said test instrument is performed by supplying at least a predetermined portion of said header information of each cell to a first input register by said test instrument, supplying said identifying information to a second input register, and employing combinatorial logic to compare the contents of said first and second registers to determine identity thereof.

8. The method of claim 7, wherein said combinatorial logic includes a plurality of exclusive-OR gates.

9. An instrument for testing the integrity of asynchronous transfer mode (ATM) communication over a virtual connection between a particular source of traffic and a particular destination of said traffic in a communication network comprising a plurality of nodes connecting a plurality of sources and a plurality of destinations, wherein messages to be transmitted between said sources and said destinations are divided into equal-length cells, each cell including a header including message type and routing information, and wherein individual sources are connected to said network by gateway nodes, such that messages to be transmitted from individual sources are assembled at said gateway nodes into sequences of cells, each cell of a given sequence of cells then being transmitted along a virtual connection extending from a gateway node through one or more intermediate switching nodes to a destination node connected to the destination of the message, said instrument being adapted to be interposed in the traffic flow path at a node to be traversed by the cells of a message being transmitted between a particular source of traffic and a particular destination of said traffic, such that all cells traversing said node traverse said instrument, said instrument comprising:

means for accepting identifying information corresponding to a virtual connection to be tested by said instrument;

means for comparing said identifying information to header information of all cells traversing said test instrument and identifying cells corresponding to said virtual connection, such that the transmission of all cells traversing said node is delayed by an identical amount;

means for providing test cells having known characteristics;

means for replacing one or more cells thus identified in a sequence of cells traversing said node with test cells; and means for monitoring the transmission of said test cells through said network.

10. The instrument of claim 9, wherein said means for comparing said identifying information to header information of each cell comprises cell filter means for providing a cell identification signal when said identifying information matches the header information of a given cell.

11. The instrument of claim 10, wherein said cell filter means for comparing said identifying information to header information of each cell comprises a content-addressable memory (CAM) comprised by said test instrument, wherein at least a defined portion of said header information of each packet traversing said node is provided to a comparand register of said content-addressable memory.

12. The instrument of claim 10, wherein said cell filter means comprises combinatorial logic comprised by said test instrument, wherein at least a defined portion of said header information of each cell is supplied to a first input register connected to said combinatorial logic, and said identifying information is supplied to a second input register connected to said combinatorial logic.

13. The instrument of claim 12, wherein said combinatorial logic comprises plural exclusive-OR gates for comparing the contents of said first and second input registers.

14. The instrument of claim 9, further comprising means for measuring one or more of cell transfer delay, cell delay variation, cell error ratio, cell loss ratio, cell misinsertion rate, and round-trip travel time.

15. The instrument of claim 9, wherein a substantially continuous stream of cells is transmitted between pairs of nodes, such that idle or unassigned cells are transmitted when no user data cell is ready for transmission, said means for comparing being capable of identifying said unassigned or idle cells in said stream of cells for replacement of unassigned or idle cells with test cells configured as operations, administration, and maintenance cells.

16. The instrument of claim 9, where said instrument is interposed in the traffic flow path at a first node for replacement of identified cells with test cells, and further comprising a second test instrument interposed in the traffic flow path at a second node to identify said test cells containing known information and retransmitting said identified test cells to said first node for detection by said first test instrument as a step in measuring the round-trip travel time thereof between said first and second nodes.

17. The combination of claim 16, wherein one or both of said first and second nodes are virtual source/virtual destination-capable nodes.

18. A method for monitoring operation of an asynchronous transfer mode (ATM) communication network, said network comprising a plurality of nodes connected by links, wherein a continuous stream of cells of predetermined length and format is transmitted between pairs of nodes at either end of active links, wherein messages to be transmitted from a source to a destination each connected to said network are divided into similar cells of predetermined length and format, all cells of a given message being transmitted along the same virtual connection comprising a series of nodes connected by links, and wherein each cell of a given message includes identical routing information in a header portion thereof, said method comprising the steps of:

connecting a test instrument comprising a cell filter to a node forming part of said network, such that all cells transiting said node pass through said test instrument;

supplying information identifying cells of interest to an input of said cell filter;

employing said cell filter to compare said information identifying cells of interest to corresponding information of each cell transiting said node, and to provide a first control signal when correspondence is detected;

providing said first control signal to a cell multiplexer;

providing a second control signal to said cell multiplexer, said second control signal defining a test cell type; and controlling said cell multiplexer to perform one of the following steps with respect to each cell received by said instrument, responsive to said first and second control signals:

(1) transmission of the received cell unaltered;

(2) modification of one or more bits of the received cell, and transmission of the modified cell; or (3) replacement of the received cell with a test cell for transmission.

19. The method of claim 18, wherein said step of modifying one or more bits of the received cell comprises the step of inserting a time stamp representative of the time of transmission in a payload portion of the transmitted cell.

20. The method of claim 18, wherein said received cells are stored in buffer means for unaltered transmission.

21. The method of claim 18, wherein said cell filter is enabled to identify unassigned or idle cells in a stream of cells, and for providing a corresponding control signal to said multiplexer, whereby said unassigned or idle cells are replaced in said cell stream by test cells.

22. The method of claim 21, wherein said unassigned or idle cells are replaced in said cell stream by test cells configured as operation, administration, and maintenance (OAM) cells.

23. The method of claim 22, wherein user cells belonging to a particular virtual connection are counted by a user cell counter comprised by said instrument, and at least one said OAM-configured test cell is transmitted after a predetermined number of user cells has been detected.

24. The method of claim 18, wherein said information identifying cells of interest corresponds to routing information comprised by all cells belonging to a particular virtual connection.

25. The method of claim 18, comprising the further steps of:

connecting a second test instrument at a second node of the network; and monitoring routing information of cells transiting said second node to identify test cells transmitted by said first instrument.

26. The method of claim 18, wherein said cell multiplexer is controlled to transmit either a modified cell or a test cell in response to each detection of correspondence indicated by said first control signal identified.

27. In combination, first and second test instruments for monitoring transmission of cells through an asynchronous transfer mode (ATM) communication network, said first test instrument being disposed at a first node of said network for identifying cells belonging to a particular virtual connection by examination of all cells transiting said first node and for modifying or replacing said identified cells with test cells, said second test instrument being disposed at a second node for identifying said test cells, each said test instrument comprising:

means for being interposed in the stream of cells transiting the respective nodes, such that all cells transiting said nodes transit said instruments;

means for accepting information identifying cells belonging to a virtual connection of interest; and means for comparing said information to portions of each cell transiting the associated node, and for providing a first control signal responsive to detection of correspondence therebetween;

at least said first test instrument further comprising means for altering or replacing identified cells with test cells; and at least said second test instrument further comprising means for identifying said test cells.

28. The combination of claim 27, wherein said first and second test instruments are substantially identical.

29. The combination of claim 27, wherein said means for comparing comprises cell filter means.

30. The combination of claim 29, wherein said cell filter means comprises a content-addressable memory.

31. The combination of claim 29, wherein said cell filter means comprises combinatorial logic.

32. The combination of claim 27, wherein at least said first test instrument comprises multiplexer means responsive to said first control signal and to a second control signal with respect to each cell received and compared, for selectively
   (1) transmitting the received cell unaltered;
   (2) altering one or more bits of the received cell, and transmitting the altered cell; or
   (3) replacing the received cell with a test cell for transmission.

33. The combination of claim 32, wherein said cell multiplexer is controlled to transmit either a modified cell or a test cell in response to each detection of correspondence indicated by said first control signal identified.

34. A test instrument for connection in the traffic flow path of a node receiving one or more substantially continuous streams of cells from other nodes in an asynchronous transfer mode (ATM) communication network, comprising:
   means for accepting and storing information signals denominating received cells to be identified;
   cell filtering means for comparing said information signals to portions of each cell in each stream of cells received by said node from said network, and for providing a first control signal responsive to correspondence therebetween;
   a source of test cells;
   a cell buffer for storing received cells; and
   a multiplexer responsive to said first control signal for selecting one of (1) a received cell having been stored in said buffer, (2) a test cell from said source, or (3) a modified version of said received cell for transmission in sequence in a stream of transmitted cells.

35. The test instrument of claim 34, further comprising a cell modification unit responsive to a second control signal for modifying one or more bits of a received cell prior to transmission.

36. The test instrument of claim 34, wherein said information signals denominating cells received from said network include one of routing information identifying cells belonging to a particular virtual connection active in said network, or information characteristic of unassigned or idle cells.

37. The test instrument of claim 34, wherein said source of test cells includes a source of test cells configured as operation, administration, and maintenance (OAM) cells.

38. The test instrument of claim 37, wherein unassigned or idle cells identified in a stream of cells by said cell filtering means are replaced in said stream by said OAM-configured test cells.

39. The test instrument of claim 38, wherein user cells belonging to a particular virtual connection are counted by a user cell counter comprised by said instrument, and at least one said OAM-configured test cell is transmitted after a predetermined number of user cells has been detected.

40. The test instrument of claim 34, wherein said cell filter means comprises a content-addressable memory.

41. The test instrument of claim 34, wherein said cell filter means comprises combinatorial logic.

42. The test instrument of claim 41, wherein said combinatorial logic comprises a plurality of exclusive-OR gates.

43. The test instrument of claim 34, wherein said cell filter means and said cell buffer for storing received cells are connected in parallel to receiver means accepting said streams of cells from the network, such that all received cells are simultaneously compared in said cell filtering means to said information signals and stored in said cell buffer, said received cells being stored in said buffer for a time sufficient to permit examination of said received cells in said cell filtering means and replacement by a test cell or modification thereof responsive to said first control signal, whereby all cells received by said test instrument or replacements or modifications thereof are delayed by an identical period before transmission with respect to the position of the received cell in the stream of received cells.

44. The test instrument of claim 34, further comprising means for injecting a timestamp reflecting the time of transmission of a test cell into the cell.

45. In a network for asynchronous transfer mode (ATM) communication, wherein pairs of nodes connected by links exchange continuous streams of cells of identical format, and wherein a given message is transmitted as a series of cells all transiting an identical virtual connection comprising a sequence of nodes, each cell including header information identifying its virtual connection, such that the header information of each cell of a given message is identical, a method for monitoring the transmission of the cells of a particular message throughout the network, comprising the steps of:
   at a first node comprised by said virtual connection:
      disposing a first test instrument such that all cells transiting said first node transit said first test instrument;
      providing said first test instrument with an information signal denominating the virtual connection of the cells of said particular message;
      comparing said information signal denominating the virtual connection of the cells of said particular message to corresponding information comprised by the headers of all cells transiting said node, and identifying one or more cells transiting said node as part of said particular message;
   altering or replacing said one or more identified cells to provide one or more test cells; and
   transmitting said one or more test cells in the stream of cells in place of the one or more identified cells; and
   at a second node comprised by said virtual connection:
      disposing a second test instrument such that all cells transiting said second node transit said second test instrument;
      providing said second test instrument with an information signal denominating the virtual connection of the cells of said particular message;
      comparing said information signal denominating the virtual connection of the cells of said particular message to corresponding information comprised by the headers of all cells transiting said second node, and identifying one or more cells transiting said second node as part of said particular message;
      comparing said one or more cells to further identification information identifying said test cells as such; and
      analyzing transmission of said test cells from said first node to said second node.

46. The method of claim 45, comprising the further step, performed at said first node, of inserting a time stamp into each test cell indicative of the time of transmission thereof, and wherein said analyzing step performed at said second node includes the step of comparing said time stamp with the time of reception of said test cells at said second node to measure the time of transmission thereof.

47. The method of claim 46, wherein a plurality of cells belonging to the same virtual connection are provided with time stamps, and are detected at said second node, and wherein the variation in the time of transmission thereof is analyzed to determine the cell delay variation.

48. The method of claim 45, wherein one or more specified bits of identified cells are modified by said first test instrument to constitute the identified cells as test cells, and wherein said analyzing step performed at said second node includes the step of detecting said modified bits.

49. The method of claim 45, wherein all cells transiting said first test instrument are stored in a buffer for a time sufficient to permit their alteration or replacement by test cells in the event of their identification as part of a particular message, such that all cells transiting said first test instrument are delayed by an identical time, and such that the order of cells in a stream of cells transiting said first test instrument is not altered thereby.

* * * * *